(12) United States Patent
Reiter

(10) Patent No.: US 9,909,754 B1
(45) Date of Patent: Mar. 6, 2018

(54) LIGHTING DEVICE FOR A BARBECUE GRILL

(71) Applicant: Joel Reiter, Virginia Beach, VA (US)

(72) Inventor: Joel Reiter, Virginia Beach, VA (US)

( * ) Notice: Subject to any disclaimer, the term of this patent is extended or adjusted under 35 U.S.C. 154(b) by 0 days.

(21) Appl. No.: 15/340,372

(22) Filed: Nov. 1, 2016

(51) Int. Cl.
| | |
|---|---|
| F21V 33/00 | (2006.01) |
| A47J 37/07 | (2006.01) |
| F21S 9/03 | (2006.01) |
| F21V 21/088 | (2006.01) |
| F21S 9/02 | (2006.01) |
| F21Y 115/10 | (2016.01) |
| F21Y 105/16 | (2016.01) |

(52) U.S. Cl.
CPC ......... F21V 33/008 (2013.01); A47J 37/0786 (2013.01); F21S 9/02 (2013.01); F21S 9/032 (2013.01); F21V 21/088 (2013.01); *F21Y 2105/16* (2016.08); *F21Y 2115/10* (2016.08)

(58) Field of Classification Search
CPC .. B60Q 1/32; B60Q 1/0076; F21S 9/03; F21S 9/032; F21S 9/035; F21S 9/037; F21L 4/08
See application file for complete search history.

(56) References Cited

U.S. PATENT DOCUMENTS

| | | | |
|---|---|---|---|
| 5,257,169 A | 10/1993 | Walendziak | |
| 6,073,623 A | 6/2000 | Maschhoff | |
| 6,851,820 B2 | 2/2005 | Choi et al. | |
| 7,500,759 B2 | 3/2009 | Lin | |
| 8,040,066 B1* | 10/2011 | Girch, Jr. ............ | F21V 21/0832 315/313 |
| D684,284 S | 6/2013 | Borovicka | |
| 8,733,965 B2 | 5/2014 | Chan | |
| 9,768,435 B2* | 9/2017 | Koebler .................. | H01M 2/34 |
| 2014/0090633 A1 | 4/2014 | Gleaton et al. | |
| 2017/0167669 A1* | 6/2017 | Purkiss ................... | F21L 4/085 |

* cited by examiner

*Primary Examiner* — Joseph L Williams
*Assistant Examiner* — Jose M Diaz
(74) *Attorney, Agent, or Firm* — Stevenson IP, LLC

(57) ABSTRACT

A lighting device for a barbecue grill including a base unit and a plurality of light emitting diodes disposed within a front side of the base unit. An activation control and a charging port are disposed on the base unit. A rechargeable battery and a power inverter are disposed within the base unit. At least one solar panel is removably attachable to the charging port, and a thermal charging apparatus is attached to the base unit. At least one grill clip attached to a rear side of the base unit. The at least one grill clip is removably engageable with a hood of a grill. Each of the plurality of light emitting diodes is downwardly disposed onto a grilling surface of the grill when the at least one grill clip is engaged with the hood of the grill.

4 Claims, 4 Drawing Sheets

LIGHTING DEVICE FOR A BARBECUE GRILL

TO ALL WHOM IT MAY CONCERN

Be it known that I, Joel Reiter, a citizen of the United States, have invented new and useful improvements in a lighting device for a barbecue grill as described in this specification.

BACKGROUND OF THE INVENTION

Various types of lighting devices are known in the prior art. However, what has been needed is a lighting device for a barbecue grill including a base unit and a plurality of light emitting diodes disposed within a front side of the base unit. What has been further needed is an activation control and a charging port disposed on the base unit, a rechargeable battery and a power inverter disposed within the base unit, at least one solar panel removably attachable to the charging port, and a thermal charging apparatus attached to the base unit. Lastly, what has been needed is at least one grill clip attached to a rear side of the base unit. The at least one grill clip is removably engageable with a hood of a grill, such that each of the plurality of light emitting diodes is downwardly disposed onto a grilling surface of the grill when the at least one grill clip is engaged with the hood of the grill. The lighting device for a barbecue grill thus provides an easily attachable light source for nighttime grilling, thus eliminating the need for a user to permanently install a standard lighting source and ensuring that food items on a grilling surface of a grill are cooked to a sufficient temperature.

FIELD OF THE INVENTION

The present invention relates to lighting devices, and more particularly, to a lighting device for a barbecue grill.

SUMMARY OF THE INVENTION

The general purpose of the present lighting device for a barbecue grill, described subsequently in greater detail, is to provide a lighting device for a barbecue grill which has many novel features that result in a lighting device for a barbecue grill which is not anticipated, rendered obvious, suggested, or even implied by prior art, either alone or in combination thereof.

To accomplish this, the present lighting device for a barbecue grill includes a base unit, optionally rectangular, having a front side, a rear side, a top side, a bottom side, a right side, and a left side. A plurality of light emitting diodes is continuously disposed within the front side of the base unit. An activation control and a charging port are disposed on the base unit. A rechargeable battery and a power inverter are disposed within the base unit. At least one solar panel is removably attachable to the charging port and in operational communication with each of the power inverter and the rechargeable battery. A thermal charging apparatus is attached to the base unit and in operational communication with the rechargeable battery. The thermal charging apparatus is configured to convert thermal heat to electric energy in order to recharge the rechargeable battery. The plurality of light emitting diodes, the activation control, and the rechargeable battery are in operational communication with each other.

The lighting device for a barbecue grill further includes at least one substantially C-shaped grill clip attached to the rear side of the base unit proximal the top side. The at least one substantially C-shaped grill clip is removably engageable with a hood of a grill. The at least one substantially C-shaped grill clip is optionally a pair in order to better secure the lighting device to the hood of the grill. Each of the plurality of light emitting diodes is then downwardly disposed onto a grilling surface of the grill when the at least one substantially C-shaped grill clip is engaged with the hood of the grill. Similarly, the plurality of light emitting diodes is optionally six in order to ensure that the grill surface is sufficiently illuminated.

Thus has been broadly outlined the more important features of the present lighting device for a barbecue grill so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
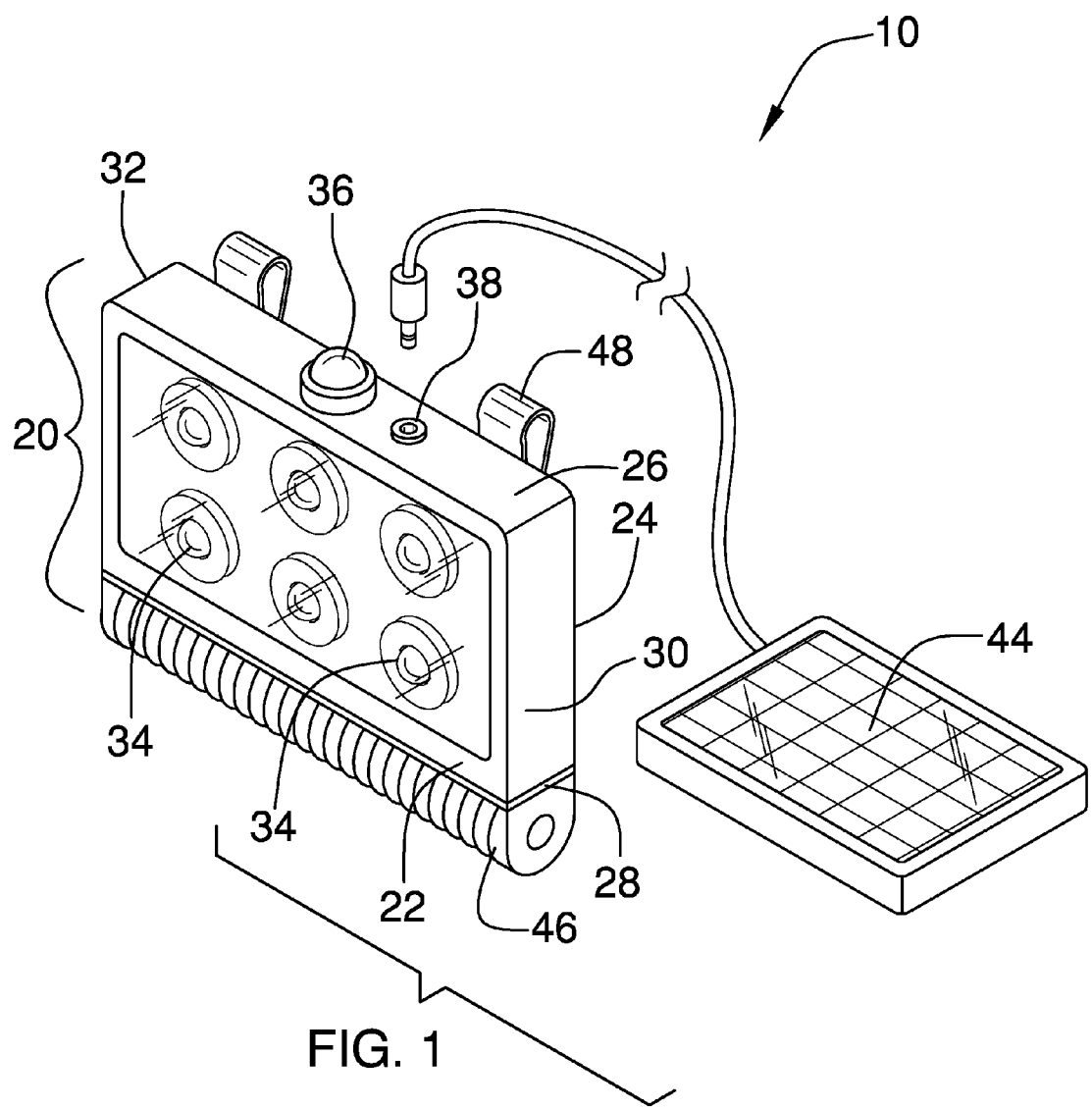
FIG. 1 is a front isometric view.
Figure 2:
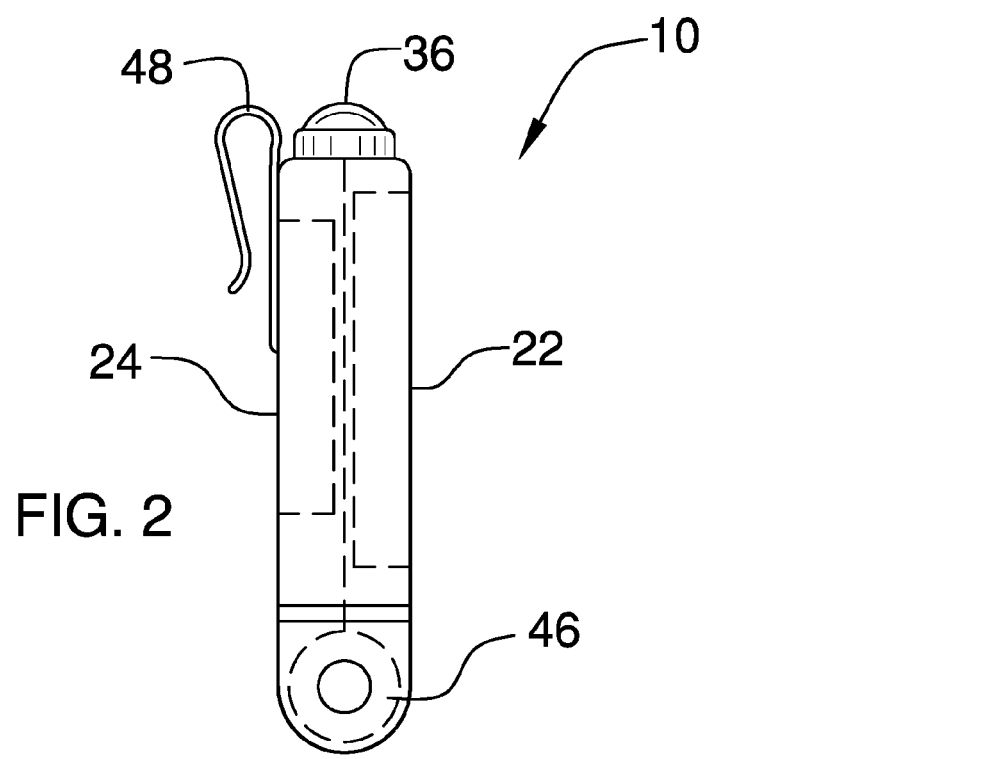
FIG. 2 is a side elevation view.
Figure 3:
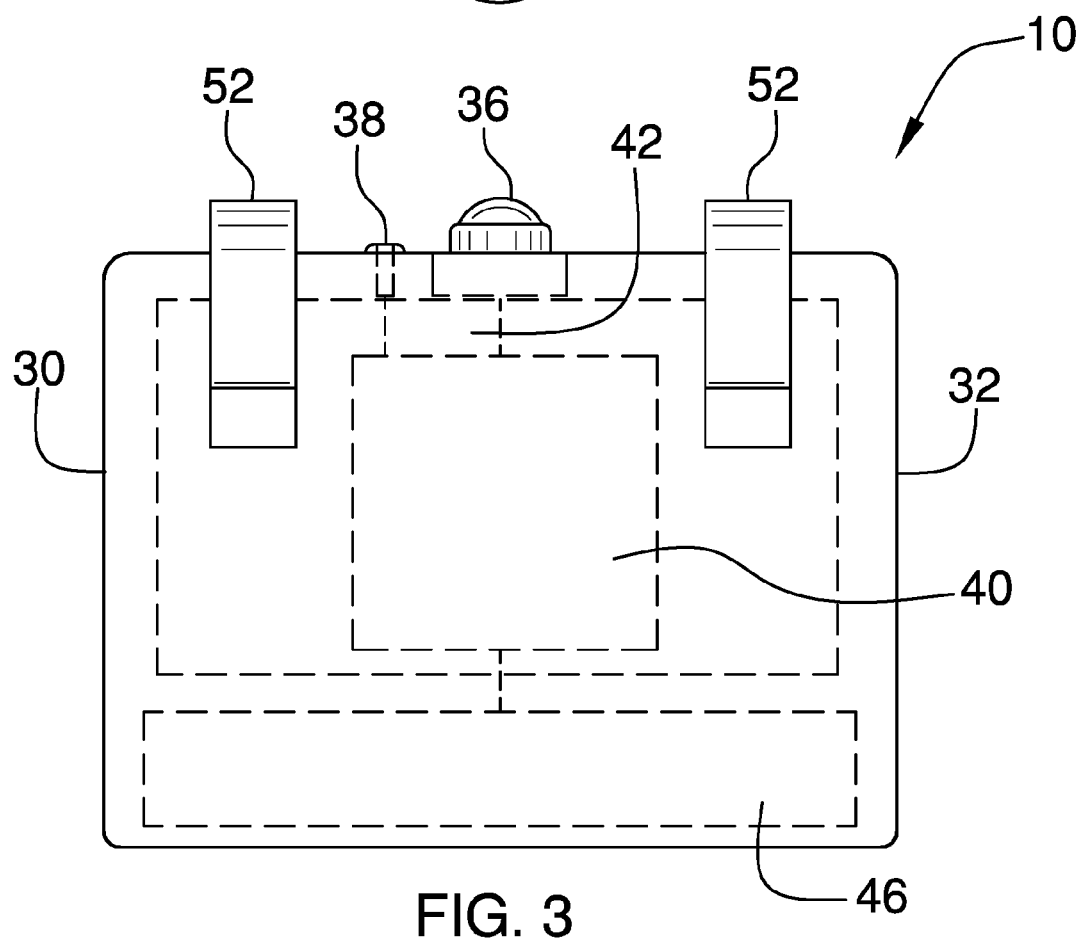
FIG. 3 is a rear elevation view.
Figure 4:
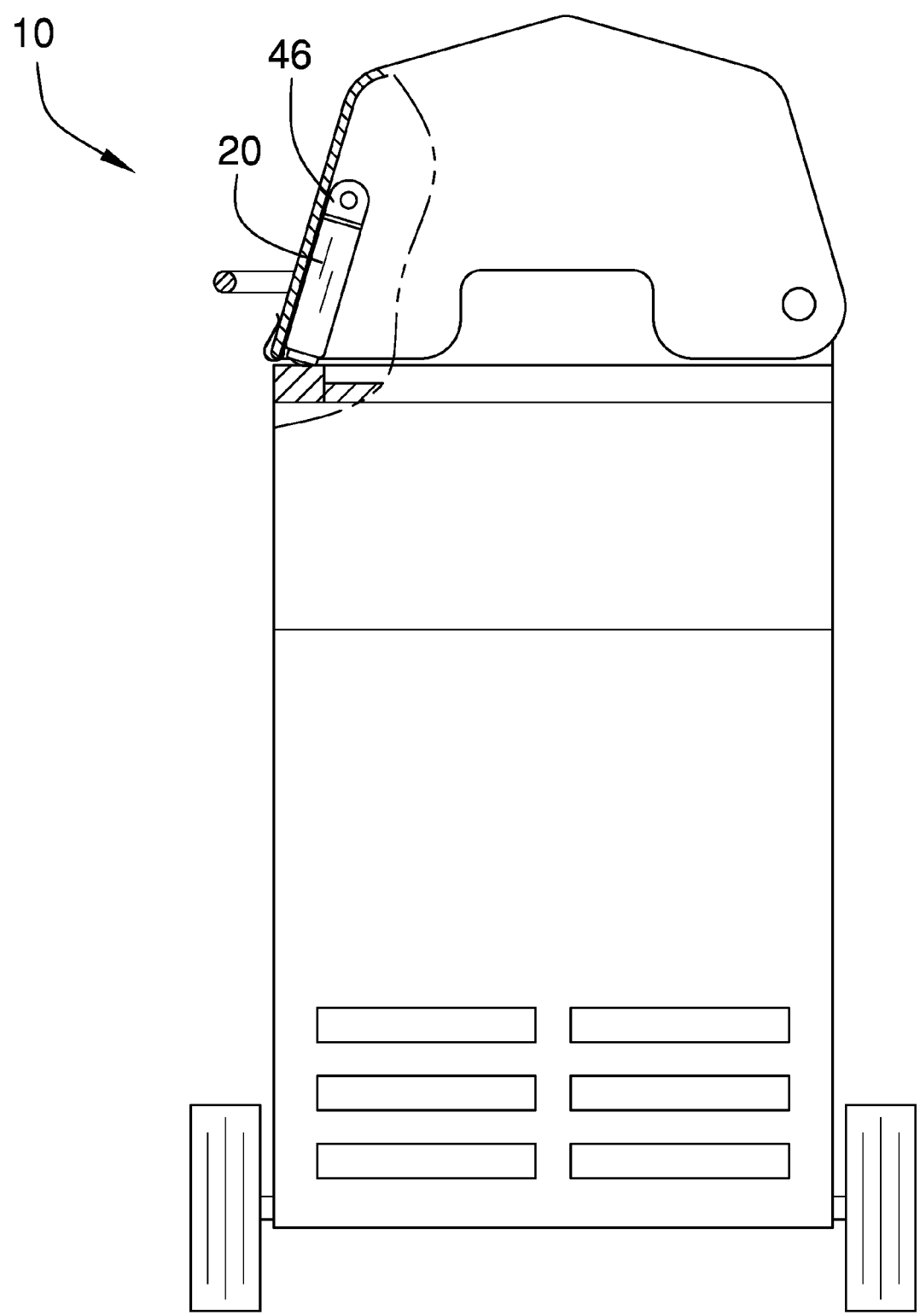
FIG. 4 is an in use view showing a hood of a grill in a closed position.
Figure 5:
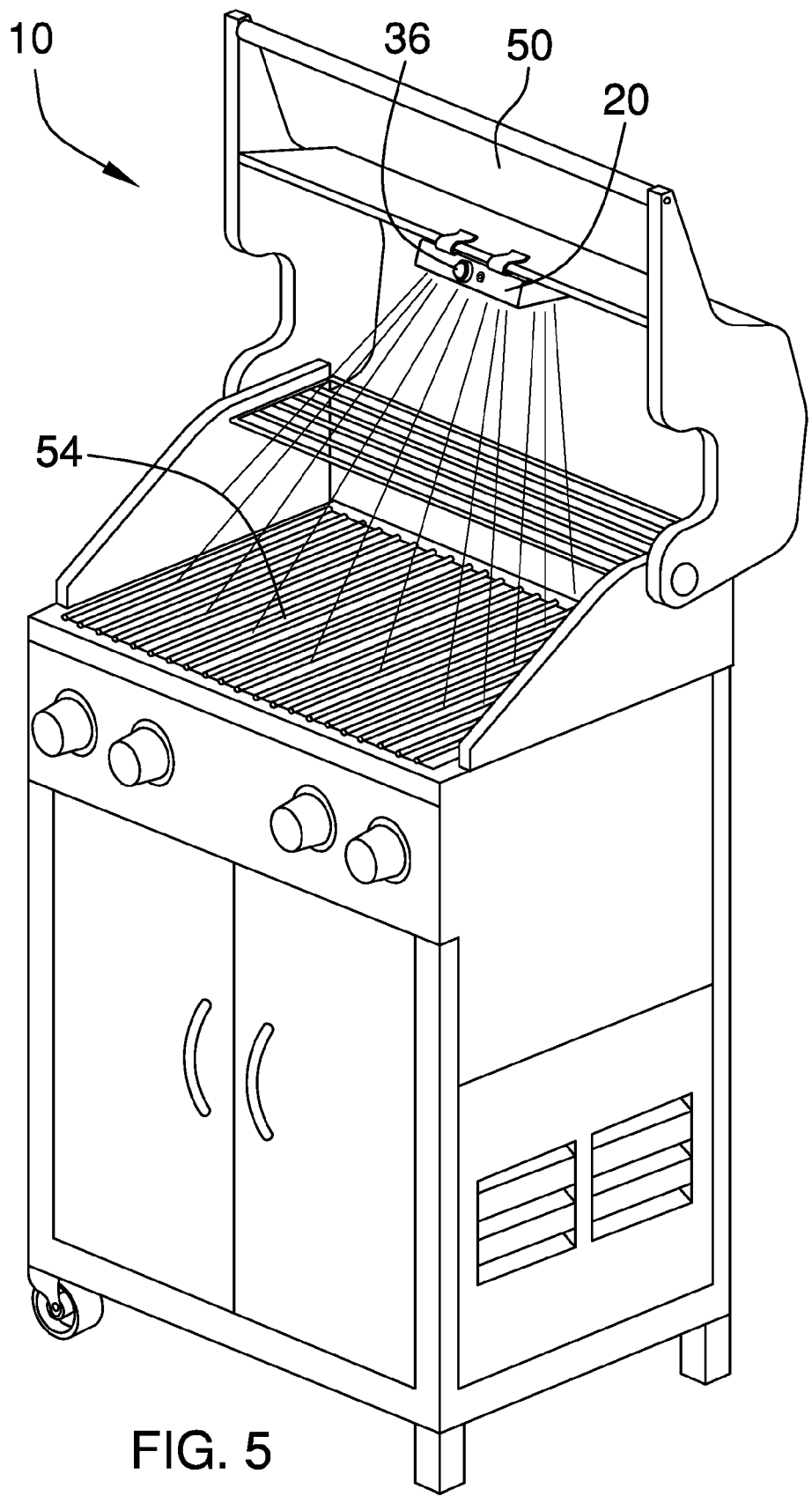
FIG. 5 is an in use view showing the hood of the grill in an open position.

With reference now to the drawings, and in particular FIGS. 1 through 5 thereof, an example of the instant lighting device for a barbecue grill employing the principles and concepts of the present lighting device for a barbecue grill and generally designated by the reference number 10 will be described.

Referring to FIGS. 1 through 5 the present lighting device for a barbecue grill 10 is illustrated. The lighting device for a barbecue grill 10 includes a base unit 20, optionally rectangular, having a front side 22, a rear side 24, a top side 26, a bottom side 28, a right side 30, and a left side 32. A plurality of light emitting diodes 34 is continuously disposed within the front side 22 of the base unit 20. An activation control 36 and a charging port 38 are disposed on the base unit 20. A rechargeable battery 40 and a power inverter 42 are disposed within the base unit 20. At least one solar panel 44 is removably attachable to the charging port 38 and in operational communication with each of the power inverter 42 and the rechargeable battery 40. A thermal charging apparatus 46 is attached to the base unit 20 and in operational communication with the rechargeable battery 40. The plurality of light emitting diodes 34, the activation control 36, and the rechargeable battery 40 are in operational communication with each other.

The lighting device for a barbecue grill 10 further includes at least one substantially C-shaped grill clip 48 attached to the rear side 24 of the base unit 20 proximal the top side 26. The at least one substantially C-shaped grill clip 48 is removably engageable with a hood of a grill 50. The at least one substantially C-shaped grill clip 48 is optionally a pair 52. Each of the plurality of light emitting diodes 34 is then downwardly disposed onto a grilling surface of the grill 54 when the at least one substantially C-shaped grill clip 48 is engaged with the hood of the grill 50. Similarly, the plurality of light emitting diodes 34 is optionally six.

What is claimed is:

1. A lighting device for a barbecue grill comprising:
   a base unit having a front side, a rear side, a top side, a bottom side, a right side, and a left side;
   a plurality of light emitting diodes continuously disposed within the front side of the base unit;
   an activation control disposed on the base unit;
   a charging port disposed on the base unit;
   a rechargeable battery disposed within the base unit;
   a power inverter disposed within the base unit;
   at least one solar panel removably attachable to the charging port and in operational communication with each of the power inverter and the rechargeable battery;
   a thermal charging apparatus attached to the base unit and in operational communication with the rechargeable battery, wherein the thermal charging apparatus is configured to convert thermal heat to electric energy in order to recharge the rechargeable battery;
   wherein the plurality of light emitting diodes, the activation control, and the rechargeable battery are in operational communication with each other; and
   at least one substantially C-shaped grill clip attached to the rear side of the base unit proximal the top side;
   wherein the at least one substantially C-shaped grill clip is removably engageable with a hood of a grill;
   wherein each of the plurality of light emitting diodes is downwardly disposed onto a grilling surface of the grill when the at least one substantially C-shaped grill clip is engaged with the hood of the grill.

2. The lighting device for a barbecue grill of claim 1 wherein the at least one substantially C-shaped grill clip is a pair.

3. The lighting device for a barbecue grill of claim 2 wherein the plurality of light emitting diodes is six.

4. The lighting device for a barbecue grill of claim 3 wherein the base unit is rectangular.

* * * * *